United States Patent Office 3,721,676
Patented Mar. 20, 1973

3,721,676
CERTAIN 3-AMINO-2(1H)PYRIDONES
Bruce E. Witzel and Tsung-Ying Shen, Westfield, Patricia M. Graham, Mountainside, Robert L. Clark, Woodbridge, and Arsenio A. Pessolano, Colonia, N.J., assignors to Merck & Co., Inc., Rahway, N.J.
No Drawing. Continuation-in-part of abandoned application Ser. No. 876,058, Nov. 12, 1969. This application June 11, 1970, Ser. No. 45,547
The portion of the term of the patent subsequent to Apr. 4, 1989, has been disclaimed
Int. Cl. C07d 31/42
U.S. Cl. 260—296 R          10 Claims

ABSTRACT OF THE DISCLOSURE

Novel secondary and tertiary aminopyridones useful as antiinflammatory, analgesic and antipyretic agents.

This application is a continuation-in-part of U.S. Ser. No. 876,058, filed Nov. 12, 1969, now abandoned.

This invention relates to a novel class of compounds. In addition it relates to a class of compounds useful in the treatment of inflammation, which also exhibit potent analgesic and antipyretic activity. More particularly the invention is concerned with amino-substituted pyridones, pyridinethiones, hydroxypyridines, and mercaptopyridines.

The novel antiinflammatory pyridones and pyridines of the invention have the following structural formulas:

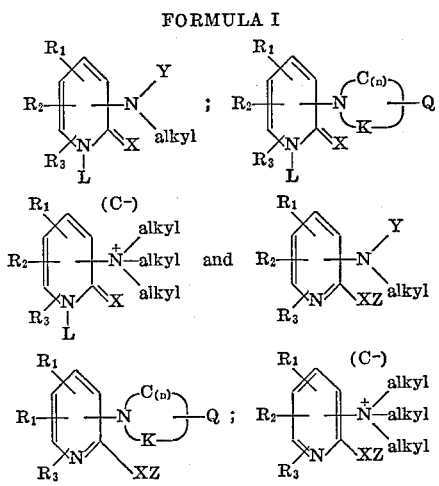

in which

Y may be hydrogen, alkyl, hydroxyalkyl, or acyl such as formyl, acetyl, propionyl, butyryl, etc., and benzoyl;

($n$) is the integer 2–6;

K may be C, O, N, S and N—W wherein W is lower alkyl or hydroxyalkyl (Representative cyclic amines include morpholino, 1-piperazino, 1-piperidino, pyrrolidino, 1-(4-methylpiperazine) and 4-thiamorpholino);

($C^-$) may be any anion moiety conventionally employed in the construction of quaternary compounds and includes chloro, bromo, iodo, p-toluenesulfonate, etc., Q may be H, alkyl, aryl, alkenyl, alkynyl, halo, nitro, hydroxy, alkoxy or amino, etc.

L may be hydrogen; alkyl (preferably lower alkyl such as methyl, ethyl, propyl, etc.); alkenyl (preferably lower alkenyl such as vinyl, allyl, methallyl, etc.); akynyl (preferably lower alkynyl such as ethynyl, methylbutynyl, propynyl, etc.); aralkyl (preferably arloweralkyl such as benzyl and substituted benzyl, phenethyl, phenylhexyl, etc.); aryl (preferably phenyl) or substituted phenyl (such as tolyl, halophenyl, hydroxyphenyl, anisyl, etc.); aralkenyl, such as styryl, etc.; hydroxyalkyl (preferably hydroxyloweralkyl such as hydroxyethyl, hydroxypropyl, etc.); amino, dialkylamino (preferably diloweralkylamino such as dimethylamino, methylethylamino, etc.); dialkylaminoalkyl (preferably diloweralkylamino loweralkyl such as diethylaminoethyl, etc.); alkylaminoalkyl (preferably loweralkylaminoloweralkyl; alkylamino (preferably loweralkylamino such as methylamino, ethylamino, etc.); carboxyalkyl (preferably carboxyloweralkyl such as carboxymethyl, carboxyethyl, carboxypropyl, etc.); haloalkyl (preferably haloloweralkyl such as trifluoromethyl, etc.); hydroxy; alkoxy; alkylamidoalkyl (preferably loweralkylamidoloweralkyl such as acetamidoethyl, etc.); alkoxyalkyl; N-alkanoyl-alkylaminoalkyl such as N - acetyl-methylaminoethyl; N-alkyl-N-alkyl-aminoalkyl such as N-ethyl-N-methylaminopropyl; aralkenyl (preferably arloweralkenyl such as styryl, phenylpropylenyl, phenylbutylenyl, etc.; heterocyclic such as furyl, tetrahydropyranyl, thienyl, thiazolyl, imidazolyl, oxazolyl, pyridyl and substituted derivatives thereof, etc.; X may be O or S;

Z may be H, alkyl or aryl such as phenyl etc.); $R_1$, $R_2$ and $R_3$ may each be haloalkyl (preferably haloloweralkyl such as trifluoromethyl, etc.); alkylthio (preferably loweralkylthio such as methylthio, ethylthio, butylthio, pentylthio, etc.); alkylsulfinyl (preferably loweralkylsulfinyl such as methylsulfinyl, ethylsulfinyl, propylsulfinyl, pentylsulfinyl, etc.); alkylsulfonyl (preferably loweralkylsulfonyl such as methylsulfonyl, ethylsulfonyl, butylsulfonyl, etc.); hydroxy; sulfonamido; sulfo; carboxyalkyl (preferably carboxyloweralkyl such as carboxymethyl, carboxyethyl, carboxybutyl, etc.); cyano; carboxy; carboxyalkyl; alkoxy (preferably lower alkoxy such as methoxy, ethoxy, butoxy, etc.); alkylaminoalkyl (preferably loweralkylaminoloweralkyl such as methylaminoethyl, etc.); N-cyclic amines such as morpholinyl, piperazinyl, piperidino and thiazolyl, etc.); carboalkoxy (preferably carboloweralkoxy as exemplified by carbomethoxy, carbopropoxy, carbobutoxy, etc.; amino; alkylamino such as ethylamino, methylamino, etc.); dialkylamino such as dimethylamino, diethylamino, ethylpropylamino, etc.); dialkylaminoalkyl (preferably diloweralkylaminoloweralkyl such as dimethylaminomethyl, etc.) alkoxyalkyl (preferably loweralkoxyloweralkyl as illustrated by methoxymethyl, methoxyethyl, ethoxypropyl, etc.); arylthio such as phenylthio; aralkylthio such as benzylthio; acylamino (preferably loweracylamino such as formylamino, acetylamino, etc.); hydroxyalkyl (preferably hydroxyloweralkyl such as hydroxymethyl, hydroxyethyl, hydroxypropyl, hydroxybutyl, etc.); acyl (preferably lower acyl such as formyl, acetyl, propionyl, butyryl, etc. and including benzoyl; alkenyl (preferably lower alkenyl such as vinyl, allyl, methallyl, etc.); alkynyl (preferably lower alkynyl such as ethynyl; propynyl, methylbutynyl, etc.); alkyl (preferably loweralkyl such as methyl, ethyl, propyl, butyl, etc.; nitro; trialkylamino such as triethylamino and methyldiethylamino; cycloalkyl (preferably cycloloweralkyl such as cyclopropyl, cyclobutyl, etc.); carbamoyl; substituted carbamoyl such as N-mono and di-alkyl or aryl substituted carbamoyl; hydrogen with the proviso that at least one R must be other than hydrogen; halogen (Br, Cl, F, I) with the proviso that if a single R is halogen at least one R must be other than hydrogen and alkyl.

The compounds of the invention which are useful in the treatment of inflammation and associated pain and fever have the following structural formulas:

FORMULA II

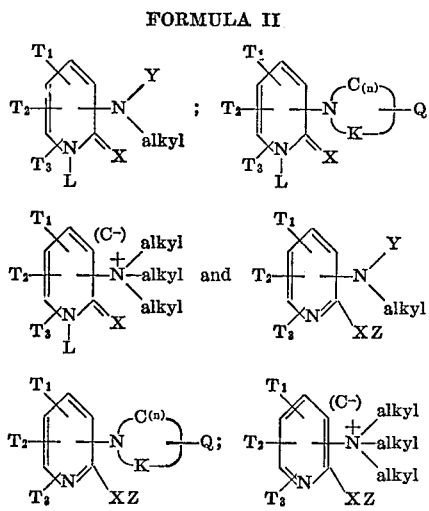

in which

Y may be hydrogen, alkyl, hydroxyalkyl, or acyl such formyl, acetyl, propionyl, etc.; and benzoyl;

($n$) is the integer 2–6;

K may be C, O, N, S and N—W wherein W is loweralkyl or hydroxyalkyl (representative cyclic amines include morpholino, 1-piperazino, 1-piperidino, pyrrolidino, 4-thiamorpholino and 1-(4-methylpiperazine, etc.;

($C^-$) may be any anion moiety conventionally employed in the construction of oxyternary compounds and includes bromo, chloro, iodo, p-toluenesulfonate, etc.

Q may be alkyl, aryl, alkenyl, alkynyl, halo, nitro, etc.

L may be hydrogen, alkyl (preferably lower alkyl such as methyl, ethyl, propyl, etc.; alkenyl (preferably lower alkenyl such as vinyl, allyl, methallyl, etc.; alkynyl (preferably lower alkynyl such as ethynyl, methylbutynyl, propynyl, etc.); aralkyl (preferably arloweralkyl such as benzyl and substituted benzyl, phenethyl, phenylhexyl, etc.); aryl (preferably phenyl) or substituted phenyl (such as tolyl, halophenyl, hydroxyphenyl, anisyl, etc.); hydroxyalkyl (preferably hydroxyloweralkyl such as hydroxymethyl, hydroxyethyl, hydroxypropyl, etc.); amino; dialkylamino (preferably diloweralkylamino such as dimethylamino, methylethylamino, etc.); dialkylaminoalkyl (preferably diloweralkylaminoloweralkyl such as diethylaminoethyl, etc.); alkylaminoalkyl; alkylamino (preferably loweralkylamino such as methylamino, ethylamino, etc.); carboxyalkyl (preferably carboxyloweralkyl such as carboxymethyl, carboxyethyl, carboxypropyl, etc.); hydroxy; alkoxy; haloalkyl (preferably haloloweralkyl such as trifluoromethyl, etc.); alkylamidoalkyl (preferably loweralkylamidoloweralkyl such as acetamidoethyl, etc.); N-alkanoyl-alkylaminoalkyl such as N-acetyl-methylaminoethyl; N-alkyl-N-alkylaminoalkyl such as N-ethyl-N-methylaminopropyl; aralkenyl (preferably arloweralkenyl such as styryl, phenylpropylenyl, phenylbutylenyl, etc.); heterocyclic such as furyl, tetrahydropyranyl, thienyl, pyridyl, thiazolyl, imidazolyl, oxazolyl and substituted derivatives thereof, etc.;

X may be O or S;

Z may be H, alkyl; or aryl such as phenyl etc.

$T_1$, $T_2$ and $T_3$ may each be haloalkyl (preferably haloloweralkyl such as trifluoromethyl, etc.); alkylthio (preferably loweralkylthio such as methylthio, ethylthio, butylthio, pentylthio, etc.); alkylsulfinyl (preferably loweralkylsulfinyl such as methylsulfinyl, ethylsulfinyl, propylsulfinyl, pentylsulfinyl, etc.); alkylsulfonyl (preferably loweralkylsulfonyl such as methylsulfonyl, ethylsulfonyl, butylsulfonyl, etc.); hydroxy; sulfonamido; sulfo; carboxyalkyl (preferably carboxyloweralkyl such as carboxymethyl, carboxyethyl, carboxybutyl, etc.); alkoxy (preferably lower alkoxy such as methoxy, ethoxy, butoxy, etc.); alkylaminoalkyl (preferably loweralkylaminoloweralkyl such as methylaminomethyl); N-cyclic amines such as morpholinyl, piperazinyl, piperidino, etc.; carboalkoxy (preferably carboloweralkoxy as exemplified by carbomethoxy, carbopropoxy, carbobutoxy, etc.); amino; alkylamino such as ethylamino and methylamino, etc.; dialkylamino such as dimethylamino, diethylamino, ethylpropylamino, etc.; dialkylaminoalkyl (preferably diloweralkylaminoloweralkyl such as dimethylaminomethyl etc.); alkoxyalkyl (preferably loweralkoxyloweralkyl as illustrated by methoxymethyl, methoxyethyl, ethoxypropyl, etc.); arylthio such as phenylthio; aralkylthio such as benzylthio; acylamino (preferably loweracylamino such as formylamino, acetylamino, etc.; hydroxyalkyl (preferably hydroxyloweralkylsuch as hydroxymethyl, hydroxyethyl, hydroxypropyl, hydroxybutyl, etc.); acyl (preferably lower acyl such as formyl, acetyl, propionyl, butyryl, etc.) and including benzoyl; alkenyl (preferably lower alkenyl such as vinyl, allyl, methallyl, etc.); alkynyl (preferable lower alkynyl such as ethynyl, propynyl, methylbutynyl, etc.); alkyl (preferably loweralkyl such as methyl, ethyl, propyl, butyl, etc.); nitro; hydrogen; halogen (chloro, bromo, iodo, fluoro); trialkylamino such as triethylamino, methyldiethylamino, etc.; cycoalkyl (preferably cycloloweralkyl such as cyclopropyl, cyclobutyl, etc.); carbamoyl; and substituted carbamoyl such as N-mono and di-alkyl and aryl substituted carbamoyl.

In its preferred aspects this invention relates to the class of compounds of Formulas I and II wherein L is hydrogen or alkyl; X is O; Y=hydrogen or lower alkyl and $R_1$ ($T_1$), $R_2$ ($T_2$) and $R_3$ ($T_3$) is hydrogen or lower alkyl with at least one of $R_1$ ($T_1$), $R_2$ ($T_2$) and $R_3$ ($T_3$) being lower alkyl.

Representative of the compounds of the invention include the following:

3-dimethylamino-5-methyl-2-[1H]-pyridone
3-dimethylamino-4-methyl-2-[1H]-pyridone
3-dimethylamino-4,5-dimethyl-2-[1H]-pyridone
3-dimethylamino-5,6-dimethyl-2-[1H]-pyridone
3-dimethylamino-4-ethyl-2-[1H]-pyridone
3-dimethylamino-5-methyl-6-ethyl-2-[1H]-pyridone
3-butylamino-5-methyl-2-[1H]-pyridone
5-methyl-3-methylamino-2-[1H]-pyridone
4,5,6-trimethyl-3-dimethylamino-2-[1H]-pyridone
3,4-dimethyl-5-dimethylamino-2-[1H]-pyridone
3-dimethylamino-6-methyl-2-[1H]-pyridone
5-dimethylamino-3-methyl-2-[1H]-pyridone
4,6-dimethyl-3-dimethylamino-2-[1H]-pyridone
3-dimethylamino-2-[1H]-pyridone
3-diethylamino-5-methyl-2-[1H]-pyridone
5-methyl-3-(4-methylpiperazin-1-yl)-2-[1H]-pyridone
4-dimethylamino-6-methyl-2-[1H]-pyridone
3-dimethylamino-6-t-butyl-2-[1H]-pyridone
3-dimethylamino-5-methyl-6-i-propyl-2-[1H]-pyridone
3-dimethylamino-5,6-dimethyl-2-pyridinethione
3-dimethylamino-5-ethyl-2-[1H]-pyridone
3-diethylamino-5-t-butyl-2-[1H]-pyridone
3-dimethylamino-6-sec-butyl-2-[1H]-pyridone
3-dimethylamino-5-ethyl-4-methyl-2-[1H]-pyridone
3-dimethylamino-5-ethyl-6-methyl-2-[1H]-pyridone
3-dimethylamino-5,6-dimethyl-2-[1H]-pyridone
3-dimethylamino-5-methyl-6-ethyl-2-[1H]-pyridone
3-dimethylamino-5-trifluoromethyl-2-[1H]-pyridone
3-dimethylamino-6-isobutyl-2-[1H]-pyridone
3-dimethylamino-5-trifluoromethyl-6-methyl-2-[1H]-pyridone
3-dimethylamino-1,5-dimethyl-2-[1H]-pyridone
3-dimethylamino-1,5-dimethyl-6-ethyl-2-[1H]-pyridone
3-dimethylamino-5-methoxy-6-methyl-2-[1H]-pyridone
3-dimethylamino-5-hydroxymethyl-6-methyl-2-[1H]-pyridone
3-dimethylamino-5-methoxymethyl-6-methyl-2-[1H]-pyridone
3-dimethylamino-5-ethoxymethyl-6-methyl-2-[1H]-pyridone
3-dimethylamino-6-methyl-2-[1H]-pyridone
3-dimethylamino-6-methyl-5-fluoro-2-[1H]-pyridone
3-dimethylamino-6-methyl-5-chloro-2-[1H]-pyridone
3-dimethylamino-4-ethyl-2-[1H]-pyridone
3-dimethylamino-5-methyl-6-(1-methoxy-1-ethyl)-2-[1H]-pyridone
3-dimethylamino-5-isopropyl-6-methyl-2-[1H]-pyridone
3-dimethylamino-6-methyl-5-acetyl-2-[1H]-pyridone
3-dimethylamino-5-methylthio-6-methyl-2-[1H]-pyridone
3-dimethylamino-5-methylsulfinyl-6-methyl-2-[1H]-pyridone
3-dimethylamino-5-methylsulfonyl-6-methyl-2-[1H]-pyridone
3-dimethylamino-6-ethyl-2-[1H]-pyridone
3-dimethylamino-5-fluoro-2-[1H]-pyridone
3-dimethylamino-5-(1-hydroxy-1-ethyl)-6-methyl-2-[1H]-pyridone
3-dimethylamino-5-dimethylsulfamyl-6-methyl-2-[1H]-pyridone
3-dimethylamino-5-diethylsulfamyl-2-[1H]-pyridone
3-dimethylamino-1-methyl-5-dimethylsulfamyl-2-[1H]-pyridone
3-dimethylamino-1-methyl-5-diethylsulfamyl-6-methyl-2[1H]-pyridone
3-dimethylamino-5-sulfonamide-6-methyl-2-[1H]-pyridone
3-dimethylamino-5-sulfonamide-2-[1H]-pyridone
3-methylamino-5-methyl-6-ethyl-2-[1H]-pyridone
3-methylamino-5-6-dimethyl-2-[1H]-pyridone
3-methylamino-5-trifluoromethyl-6-methyl-2-[1H]-pyridone
3-methylamino-1-methyl-5-methyl-2-[1H]-pyridone
3-methylamino-5-fluoro-6-methyl-2-[1H]-pyridone
3-methylamino-5-methylthio-6-methyl-2-[1H]-pyridone
3-methylamino-5-methylsulfinyl-6-methyl-2-[1H]-pyridone
3-methylamino-5-methylsulfonyl-6-methyl-2-[1H]-pyridone
3-methylamino-5-hydroxymethyl-6-methyl-2-[1H]-pyridone
3-methylamino-5-methoxymethyl-6-methyl-2-[1H]-pyridone
3-methylamino-5-ethoxymethyl-6-methyl-2-[1H]-pyridone
3-methylamino-5-methoxy-6-methyl-2-[1H]-pyridone
3-methylamino-5-ethyl-6-methyl-2-[1H]-pyridone
3-methylamino-5-acetyl-6-methyl-2-[1H]-pyridone
3-methylamino-5-(1-hydroxy-1-ethyl)-6-methyl-2-[1H]-pyridone
5-dimethylamino-3,4-dimethyl-2-[1H]-pyridone
5-dimethylamino-4-methyl-2-[1H]-pyridone Additional but nonlimiting embodiments within the scope of the invention include:

5-chloro-3-dimethylamino-4,6-dimethyl-2[1H]-pyridone
4-methyl-3-trimethylammonium-2-[1H]-pyridone iodide
6-methyl-3-N-morpholino-2-[1H]-pyridone
5-chloro-3-dimethylamino-6-methyl-2[1H]-pyridone
6-methyl-3-trifluoromethyl-5-dimethylamino-2-[1H]-pyridone
3-acetyl-5-dimethylamino-6-methyl-2-[1H]-pyridone
3α-hydroxyethyl-5-dimethylamino-6-methyl-2-[1H]-pyridone
6-methyl-5-dimethylamino-3-vinyl-2-[1H]-pyridone
4-t-butyl-5-cyano-3-dimethylamino-2-[1H]-pyridone
5,6-dimethoxy-3-dimethylamino-2[1H]-pyridone
5-hydroxymethyl-6-ethyl-3-dimethylamino-2[1H]-pyridone
6-hydroxymethyl-5-methyl-3-dimethylamino-2[1H]-pyridone
6-methoxy-5-methyl-3-dimethylamino-2[1H]-pyridone
3-methylamino-5-methylthio-6-t-butyl-2[1H]-pyridone
5-methylsulfinyl-4-ethyl-3-methylamino-2[1H]-pyridone
3-dimethylamino-6-ethyl-5-nitro-2[1H]-pyridone
5-methoxy-6-methyl-1,3-dimethylamino-2[1H]-pyridone
5-carbamyl-4-methyl-3-dimethylamino-2[1H]-pyridone
5-fluoro-6-methyl-3-dimethylamino-2[1H]-pyridone
4-t-butyl-1-methyl-3-dimethylamino-2[1H]-pyridone
5-t-butyl-3-methylamino-1-phenyl-2[1H]-pyridone
5-ethyl-6-methyl-1-allyl-3-dimethylamino-2[1H]-pyridone
5-ethyl-3-dimethylamino-1-tetrahydropyranyl-2[1H]-pyridone
3-dimethylamino-6-methyl-2[1H]-pyridone-5-sulfonamide
3-dimethylamino-5-ethyl-2-methoxypyridine
3-dimethylamino-5,6-dimethyl-2-pyridinethione
6-benzylthio-3-dimethylamino-2[1H]-pyridone
4-carboxymethyl-3-dimethylamino-2[1H]-pyridone The substituted pyridones and pyridines of the invention possess a high degree of anti-inflammatory, analgesic and antipyretic activity. They are of value in the treatment of arthritic and dermatological disorders or like conditions responsive to anti-inflammatory drugs. In general they are indicated for a wide variety of conditions where one or more of the symptoms of inflamation, fever and pain are mainfested. Included within this category are diseases such as rheumatoid arthritis, osteo arthritis, gout, infectious arthritis and rheumatic fever. As indicated above the compounds of the invention also possess a useful degree of analgesic and anti-pyretic activity.

For these purposes the compounds of the invention may be administered orally, topically, parenterally, by inhalation spray or rectally in formulations containing conventional non-toxic pharmaceutically acceptable carriers, adjuvants and vehicles. The term parenteral as used herein includes subcutaneous injections, intravenous, intramuscular, intrasternal injection or infusion techniques. In addition to the treatment of warm-blooded animals such as mice, rats, horses, dogs, cats, etc., the compounds of the invention are effective in the treatment of humans.

The pharmaceutical compositions containing the active ingredient may be in a form suitable for oral use, for example, as tablets, troches, lozenges, aqueous or oily suspensions, dispersible powders or granules, emulsions, hard or soft capsules, or syrups or elixirs. Compositions intended for oral use may be prepared according to any method known to the art for the manufacture of pharmaceutical compositions and such compositions may contain one or more agents selected from the group consisting of sweetening agents, flavoring agents, colouring agents and preserving agents in order to provide a pharmaceutically elegant and palatable preparation. Tablets contain the active ingredient in admixture with non-toxic pharmaceutically acceptable excipients which are suitable for the manufacture of tablets. These excipients may be, for example, inert diluents, such as calcium carbonate, sodium carbonate, lactose, calcium phosphate or sodium phosphate; granulating and disintegrating agents, for example maize starch, or alginic acid; binding agents, for example starch, gelatine or acacia, and lubricating agents, for example magnesium stearate, stearic acid or talc. The tablets may be uncoated or they may be coated by known techniques to delay disintegration and absorption in the gastro-intestinal tract and thereby provide a sustained action over a longer period. For example, a time delay material such as glyceryl monostearate or glyceryl distearate above or with a wax may be employed.

Formulations for oral use may also be presented as hard gelatine capsules wherein the active ingredient is mixed with an inert solid diluent, for example calcium carbonate, calcium phosphate or kaolin, or as soft gelatine capsules wherein the active ingredient is mixed with water or an oil medium, for example arachis oil, peanut oil, liquid paraffin or olive oil.

Aqueous suspensions contain the active materials in admixture with excipient suitable for the manufacture of aqueous suspensions. Such excipients are suspending agents, for example sodium carboxymethylcellulose, methylcellulose, hydroxypropylmethylcellulose, sodium alginate, polyvinylpyrrolidone, gum tragacanth and gum acacia; dispersing or wetting agents may be a naturally-occurring phosphatide, for example lecithin, or condensation products of an alkylene oxide with fatty acids, for example polyoxyethylene stearate, or condensation products of ethylene oxide with long chain aliphatic alcohols, for example heptadecaethyleneoxy-cetanol, or condensation products of ethylene oxide with partial esters derived from fatty acids and a hexitol such as polyoxyethylene sorbitol mono-oleate, or condensation products of ethylene oxide with partial esters derived from fatty acids and hexitol anhydrides, for example polyoxyethylene sorbitan mono-oleate. The said aqueous suspensions may also contain one or more preservatives, for example ethyl, or n-propyl, p-hydroxy benzoate, one or more colouring agents, one or more flavouring agents and one or more sweetening agents, such as sucrose, saccharin, or sodium or calcium cyclamate.

Oily suspensions may be formulated by suspending the active ingredient in a vegetable oil, for example arachis oil, olive oil, sesame oil or coconut oil, or in a mineral oil such as liquid paraffin. The oily suspensions may contain a thickening agent, for example beeswax, hard paraffin or cetyl alcohol. Sweetening agents, such as those set forth above, and flavouring agents may be added to provide a palatable oral preparation. These compositions may be preserved by the addition of an anti-oxidant such as ascorbic acid.

Dispersible powders and granules suitable for preparation of an aqueous suspension by the addition of water provide the active ingredient in admixture with a dispersing or wetting agent, suspending agent and one or more preservatives. Suitable dispersing or wetting agents and suspending agents are exemplified by those already mentioned above. Additional excipients, for example sweetening, flavouring and colouring agents, may also be present.

The pharmaceutical compositions of the invention may also be in the form of oil-in-water emulsions. The oily phase may be vegetable oil, for example olive oil or arachis oils, or a mineral oil, for example liquid paraffin or mixtures of these. Suitable emulsifying agents may be naturally-occurring gums, for example gum acacia or gum tragacanth, naturally-occurring phosphatides, for example soya bean lecithin, and esters or partial esters derived from fatty acids and hexitol anhydrides, for example sorbitan mono-oleate, and condensation products of the said partial esters with ethylene oxide, for example polyoxyethylene sorbitan mono-oleate. The emulsions may also contain sweetening and flavouring agents.

Syrups and elixirs may be formulated with sweetening agents, for example glycerol, sorbitol or sucrose. Such formulations may also contain a demulcent, a preservative and flavouring and colouring agents. The pharmaceutical compositions may be in the form of a sterile injectable preparation, for example as a sterile injectable aqueous or oleagenous suspension. This suspension may be formulated according to the known art using those suitable dispersing or wetting agents and suspending agents which have been mentioned above. The sterile injectable preparation may also be a sterile injectable solution or suspension in a non-toxic parenterally-acceptable diluent or solvent, for example as a solution in 1:3-butane diol. Among the acceptable vehicles and solvents that may be employed are water, Ringer's solution and isotonic sodium chloride solution. In addition, sterile, fixed oils are conventionally employed as a solvent or suspending medium. For this purpose any bland fixed oil may be employed including synthetic mono- or diglycerides. In addition, fatty acids such as oleic acid find use in the preparation of injectibles.

The compounds of this invention may also be administered in the form of suppositories for rectal administration of the drug. These compositions can be prepared by mixing the drug with a suitable non-irritating excipient which is solid at ordinary temperatures but liquid at the rectal temperature and will therefore melt in the rectum to release the drug. Such materials are cocoa butter and polyethylene glycols.

For topical use, creams, ointments, jellies, solutions or suspensions etc. containing the anti-inflammatory agents are employed.

Dosage levels of the order of 10 mg. to 7 grams per day are useful in the treatment of the above indicated conditions. For example, inflammation is effectively treated and anti-pyretic and analgesic activity manifested by the administration from about .3 to 100 milligrams of the compound per kilogram of body weight per day. Advantageously from about 2 mg. to about 50 mg. per kilogram of body weight and especially from about 4 mg. to about 20 mg./kg. per daily dosage produce highly effective results.

The amount of active ingredient that may be combined with the carrier materials to produce a single dosage form will vary depending upon the host treated and the particular mode of administration. For example, a formulation intended for the oral administration of humans may contain from 5 mg. to 5 grams of active agent compounded with an appropriate and convenient amount of carrier material which may vary from about 5 to about 95 percent of the total composition. Dosage unit forms will generally contain between from about 25 mg. to about 500 mg. of active ingredient.

It will be understood, however, that the specific dose level for any particular patient will depend upon a variety of factors including the activity of the specific compound employed, the age, body weight, general health, sex, diet, time of administration, route of administration, rate of excretion, drug combination and the severity of the particular disease undergoing therapy.

A convenient method for the preparation of the compounds of the invention as illustrated in Flow Sheet I involves, in general, oxidation of a pyridine (A) to the corresponding N-oxide (F). The N-oxide may be converted to the 2-[1H]-pyridone by heating with a lower alkanoic anhydride or active inorganic halide which results in the formation of the 2-acyloxy or 2-halo pyridine which upon acid, neutral, or basic hydrolysis gives the 2-[1H]-pyridone (E). Nitration of the pyridone (E) will result in the corresponding nitropyridone (D). The nitropyridone (D) may be prepared in an alternative manner by amination of the pyridine (A) to produce the aminopyridine (B). The aminopyridine (B) may be either nitrated to produce a amino-nitropyridine (C) which is then diazotized to the nitropyridone (D) or alternatively the aminopyridine is initially converted to the pyridone (E) and then nitrated to produce the nitropyridine (D). Reduction of the nitropyridine (D) to the aminopyridone (H) followed by alkylation of the amine will result in the preparation of the alkylaminopyridone (G) of the invention. One skilled in the art shall appreciate that the pyridones may be readily converted to the corresponding thiopyridones (L) by treatment with agents such as phosphorous pentasulfide. The aminopyridones and aminothiopyridones may be converted to the 1-substituted material (M) by reacting compounds (G) or (L) with a strong base such as sodium hydride in an inert atmosphere to activate the 1-nitrogen. Addition of an appropriate alkylating agent, etc. results in the production of the corresponding N-substituted material (M). The 1-substituted pyridones are also prepared via substitution on the 1-position of the pyridone compounds (D and E) followed by nitration and/or reduction to give (M).

Alternatively the 2[1H]-pyridone (E) may be halogenated to produce the halo-2[1H]-pyridone (J) which may then be converted to the alkylaminopyridone (G) of the invention by amination.

Flow Sheet II: The enol-ethers and thioethers of the pyridones of this invention are prepared via a number of alternative routes including alkylation with diazoalkanes, alkylation or arkylation of the silver salts and displacement of a halopyridine with an alkoxide (or aroxide) or alkylmercaptide (or arylmercaptide).

For example, a 2-halonitropyridine (T) is prepared by halogenation of the nitropyridone (D). Reaction with a metal alkoxide (aryloxide) or metal alkylmercaptide (arylmercaptide) produces the nitropyridine of the formula (R). Reduction of the nitropyridine results in the aminopyridine (S). Reductive alkylation of (R) yields the enol ethers and thioethers (T). Where A is hydrogen, N-acylation of the amine using, for example, the acid anhydride produces the acyl-substituted amine of the formula (Q). Cleavage of the ethers (T) and (Q) results in the production of the corresponding pyridones and thiopyridones (V) and (W).

Flow Sheet III: The cyclic amines of this invention (I), (II) and (III) are prepared by the following methods:

An aminopyridine (H or S) is reacted at elevated temperatures in a suitable solvent (such as N-methylpyrrolidone) with a bis-halo compound (such as bis(β-bromoethyl)ether, mechlorethamine, etc.), an inert base (calcium carbonate, etc.) being present to scavenge the acid liberated. Alternately, a halopyridone (J) is reacted at elevated temperatures in a similar solvent with a cyclic amine (such as pyrrolidine, morpholine, etc.) yielding the desired aminopyridone. The N–1 substituted derivatives are prepared in accordance with Flow Sheet I. Cleavage of the ether of (II) employing, for example, boron tribromide, results in the preparation of the pyridone (I).

The quaternary compounds of this invention are prepared by reacting the tertiary amine products with alkyl halides (or alkyl toluenesulfonates) in excess or in inert solvents at temperatures ranging from below room temperature to boiling point of the solvent followed by isolation.

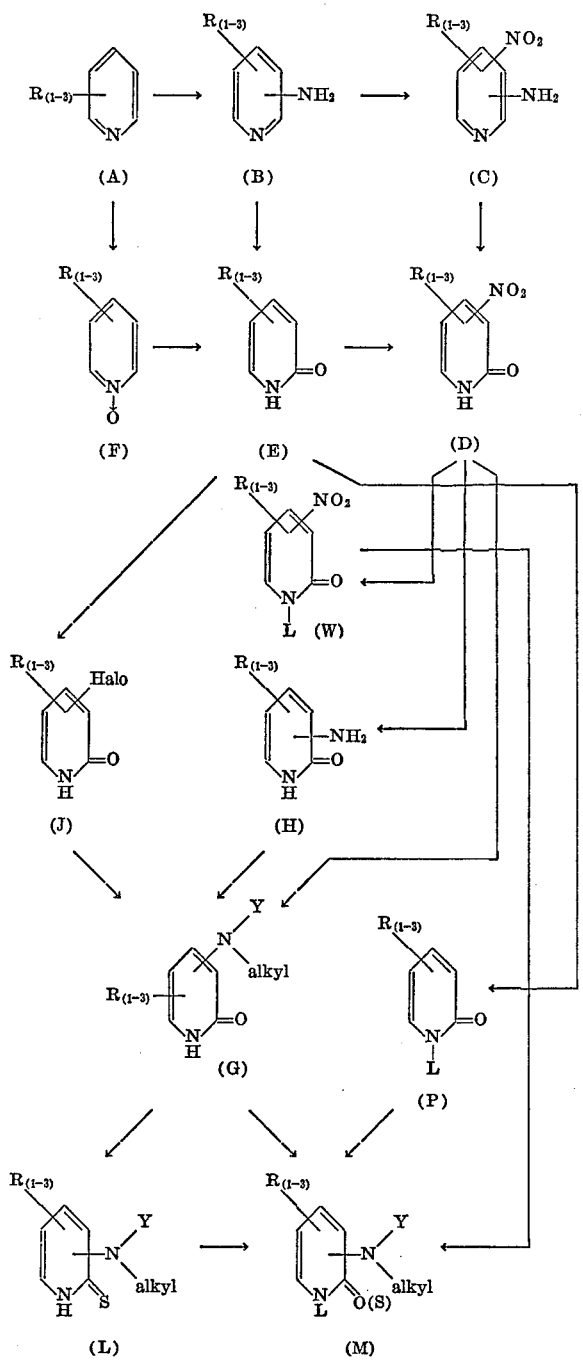

FLOW SHEET I

L, $R_1$, $R_2$, $R_3$ and Y are as indicated above.

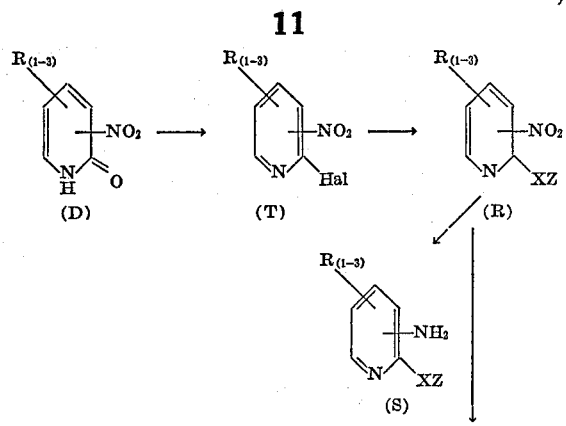

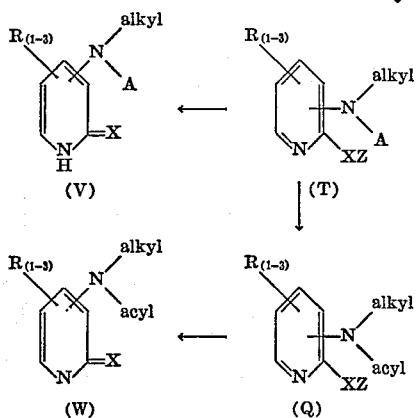

A is H or alkyl; R, X, Z, L are as set forth above.

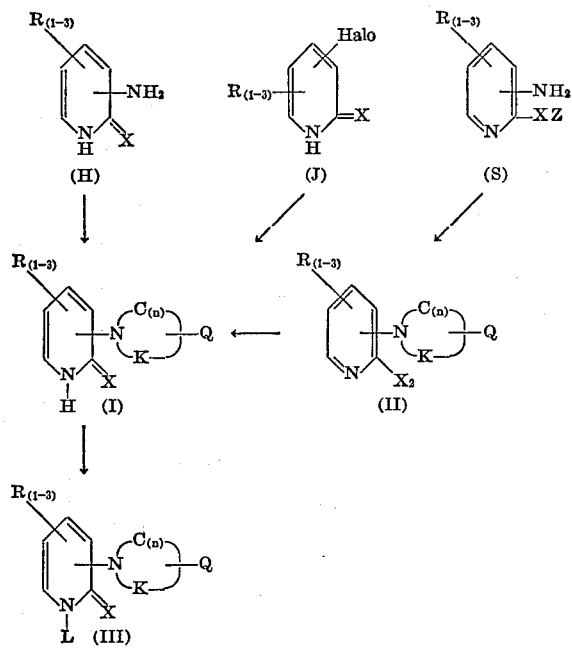

R, X, Z, L, K, Q are as set forth above.

In the examples which follow, non-limiting illustrations of procedures for producing the compounds of the invention are provided.

EXAMPLE 1

Preparation of 2-amino-4-t-butylpyridine

To a stirred suspension of freshly prepared sodamide (from 24 g. sodium) in dimethylaniline (90 ml.) [prepared via procedure of Organic Reactions, vol. I] is added 4-t-butylpyridine (108 g., 0.8 m.) and the resultant mixture heated slowly to ca. 155° C. After hydrogen evolution has noticeably slowed, the reaction is allowed to continue for 5 hours and cooled. The mixture is then decomposed with 5% sodium hydroxide solution (160 ml.), extracted with benzene and the benzene extracts dried, concentrated in vacuo, and the oily residue fractionally crystallized from ether-petroleum ether to give 2-amino-4-t-butylpyridine, M.P. 77–80° C. (hexane).

When other alkylpyridines, such as the ethylpyridines, the picolines, propylpyridine, 3-t-butylpyridine, 2,3-dimethylpyridine, 3,4 - dimethylpyridine, 3,5,6 - trimethylpyridine, 4,5,6-trimethylpyridine, the methyl-ethylpyridines, 2-n-butylpyridine, etc. are treated as above, the corresponding α-aminopyridine is obtained, respectively.

For example, when an equimolar amount of the pyridines of Table I below are substituted for 4-t-butylpyridine in the amination procedure of Example I, the corresponding aminopyridines of Table II below are obtained.

TABLE I.—PYRIDINES 5,6-dimethylpyridine
5-methyl-6-ethylpyridine
6-isobutylpyridine
6-methylpyridine
4-ethylpyridine
5-isopropyl-6-methylpyridine
6-ethylpyridine
5-ethyl-6-methylpyridine

TABLE II.—AMINOPYRIDINES 2-amino-5,6-dimethylpyridine
2-amino-5-methyl-6-ethylpyridine
2-amino-6-isobutylpyridine
2-amino-6-methylpyridine
2-amino-4-ethylpyridine
2-amino-5-isopropyl-6-methylpyridine
2-amino-6-ethylpyridine
2-amino-5-ethyl-6-methylpyridine

EXAMPLE 2

Preparation of 2-amino-4-t-butyl-3-nitropyridine

To an ice-cooled, stirred mixture of 2-amino-4-t-butylpyridine (29 g., 0.19 ml.) of Example I in concentrated sulfuric acid (120 ml.) is added concentrated nitric acid (15.2 ml.) in sulfuric acid (30 ml.) over ca. 1.3 hours while keeping the temperature of the mixture less than 6° C. After warming to room temperature, the mixture is slowly heated to 92° and kept three hours at this temperature. The mixture is then cooled, added to 2 l. ice, and basified with concentrated ammonium hydroxide. The oil obtained is extracted with chloroform, the chloroform removed in vacuo, and the residue stream distilled. The distillate is collected until the pot is void of the more volatile isomer (ca. 14 l.). Extraction of the distillation with methylene chloride yields a yellow solid, the N.M.R. of which indicates bettet than 3:1 the 3-nitro isomer, i.e., 2-amino-4-t-butyl-3-nitropyridine.

Extraction of the pot-residue with chloroform yields crude 5-nitro isomer which is purified via column chromatography. Alternatively, the crude material is dissolved in dilute sulfuric acid, filtered, and the filtrate collected for use as is.

When other alkylated 2-aminopyridines, such as 2-amino-6-ethylpyridine, 2-amino-4,5- or 6-methylpyridines, 2-amino-4-propylpyridine, 2-amino-4,5-dimethylpyridine, 2-amino-5,6-dimethylpyridine, 2-amino-4,5,6-trimethylpyridine, 2 - amino-4,6-dimethyl-5-ethylpyridine, 2-amino-6-pentylpyridine, 2-amino - 6 - methyl-5-propylpyridine, etc. are nitrated as above, the corresponding amino-nitro-alkylpyridines are obtained.

When 2-aminopyridine is used, the nitro-pyridyl amines are obtained.

Nitration of the aminopyridines of Example 1 results in the formation of the corresponding aminonitropyridine. For example, replacing the 2-amino-4-t-butylpyridine in the above procedure with the aminopyridines of Table II yields respectively the following aminonitropyridines of Table III:

TABLE III.—AMINONITROPYRIDINES 2-amino-3-nitro-5,6-dimethylpyridine
2-amino-3-nitro-5-methyl-6-ethylpyridine
2-amino-3-nitro-6-isobutylpyridine
2-amino-3-nitro-6-methylpyridine
2-amino-3-nitro-4-ethylpyridine
2-amino-3-nitro-5-isopropyl-6-methylpyridine
2-amino-3-nitro-6-ethylpyridine
2-amino-3-nitro-5-ethyl-6-methylpyridine
2-amino-3-nitro-4,5,6-trimethylpyridine

EXAMPLE 3

Preparation of 4-t-butyl-3-nitro-2-[1H]-pyridone

To a stirred solution of the 2-amino-4-t-butyl-3-nitropyridine (6.2 g., 0.032 m.) of Example II in a sulfuric acid (9 ml.)-water (90 ml.) mixture at 5° is added a concentrated aqueous solution of sodium nitrite (2.4 g., 0.033 m.) while keeping the temperature below 10° C. by external cooling. The mixture is allowed to warm to room temperature, heated to 45° C., cooled, filtered and the collected product washed with water and dried to give crude 4-t-butyl-3-nitro-2[1H]-pyridone. Recrystallization from ether-methylene chloride yields pure material, M.P. 222–224.5° C.

When the sulfuric acid solution of the 5-nitroisomer (Example 2) is used above, 4-t-butyl-5-nitro-2[1H]-pyridone is obtained.

When the nitro-aminopyridines of Example 2, or the aminopyridines of Example 1 are diazotized as above, the corresponding alkyl nitro pyridones and alkylpyridones are obtained.

For example, diazotization of the nitroaminopyridines of Table III results in the production of the nitropyriddones of Table IV.

TABLE IV.—NITROPYRIDONES 3-nitro-5,6-dimethylpyridone
3-nitro-5-methyl-6-ethylpyridone
3-nitro-6-isobutylpyridone
3-nitro-6-methylpyridone
3-nitro-4-ethylpyridone
3-nitro-5-isopropyl-6-methylpyridone
3-nitro-6-ethylpyridone
3-nitro-5-ethyl-6-methylpyridone
3-nitro-5-methyl-6-ethylpyridone
3-nitro-4,5,6-trimethylpyridone

EXAMPLE 4

Preparation of 4-t-butylpyridine-N-oxide

To a stirred solution of 4-t-butylpyridine (27 g., 0.2 m.) in glacial acetic acid (100 ml.) at 33° C. is added 30% aqueous hydrogen peroxide (25 ml.) and the resultant mixture heated to ca. 75° C. Additional (30 ml.) 30% peroxide is added and the reaction mixture heated overnight, cooled and solid sodium bisulphite is added to destroy the excess peroxide. The mixture is then concentrated in vacuo to a residue. Chloroform is then added, and the mixture stirred with anhydrous sodium carbonate until all acetic acid traces are neutralized. The mixture is then filtered, and the chloroform solution concentrated in vacuo to a golden yellow oil which crystallizes to a hygroscopic white waxy solid on standing identified as 4-t-butylpyridine-N-oxide.

When the alkylpyridine starting materials of Example 1 are treated as above, the corresponding alkylpyridine-N-oxides are obtained.

For example, when the alkylpyridines such as the picolines, 3-propylpyridine, 3-t-butylpyridine, 2,3-dimethyl pyridine, 3,4-dimethylpyridine, 3,5,6-trimethylpyridine, 4,5,6-trimethylpyridine, the methylethylpyridines, 2-n-butylpyridine, 5-methylpyridine, 4-ethyl-5-fluoropyridine, 5-ethyl-6-trifluoromethylpyridine, etc. . . . are employed in the above reaction in place of 4-t-butylpyridine the corresponding N-oxides are obtained.

EXAMPLE 5

Preparation of 4-t-butyl-2[1H]-pyridone

A mixture of the 4-t-butylpyridine-N-oxide of Example 4 (12 g., 0.08 m.) and acetic anhydride (35 ml.) is stirred and heated at gentle reflux for eighteen hours (nitrogen atmosphere). On cooling, the mixture is added to ice-water (300 ml.). Solid sodium bicarbonate is then added to basify the mixture and the mixture cooled and filtered to yield 4-t-butyl-2[1H]-pyridone. Extraction of the aqueous mother liquors with chlorform yields additional product. Recrystallization from acetone yields a pure material, M.P. 139–140.5° C.

As an alternative method of preparing the pyridone one may react the N-oxide with sulfuryl chloride (or the equivalent) to obtain the 2-chloropyridine. Hydrolysis of the chloro group yields the corresponding pyridone.

EXAMPLE 6

Preparation of 4-t-butyl-5-nitro-2[1H]-pyridone

To a stirred solution of 4-t-butylpyridone obtained from Example 5 (1.0 g., 0.01 m.) in concentrated sulfuric acid (15 ml.) at ice-bath temperatures is added concentrated nitric acid (0.9 ml., 0.01 m.) dropwise over ca. 30 minutes. The solution is allowed to warm to room temperature overnight and then added to ice-water (250 ml.) in small portions. The solution is then filtered, washed with water and dried to give a pale yellow solid. N.m.r. indicates ca. 4:1 ratio of 5-nitro to 3-nitro isomer. Recrystallization from ether yields 4-t-butyl-5-nitro-2[1H]-pyridone, M.P. 140–144° C.

When the pyridones of Examples 3 and 5 are nitrated as above, the corresponding nitropyridones are obtained.

For example, replacing the 4-t-butylpyridone in the above procedure with the following:

5-methyl-2[1H]-pyridone
4-ethyl-6-fluoro-2[1H]-pyridone yields respectively:

5-methyl-3-nitro-2[1H]-pyridone
4-ethyl-5-nitro-6-fluoro-2[1H]-pyridone

EXAMPLE 7

Preparation of 3-bromo-5-methyl-2[1H]-pyridone

To a stirred solution of 5-methyl-2[1H]-pyridone (6.5 g., 0.06 m.) in chloroform (200 ml) at 2° C. is added a chloroform (20 ml.) solution of bromine (9.6 g., 0.06 m.) over 75 minutes while keeping the temperature below 5° C. After addition, the mixture is allowed to warm to room temperature overnight. Water (40 ml.) is added, followed by solid potassium carbonate until the aqueous layer is slightly basic. The chloroform layer is separated, dried, filtered and concentrated to yield 3-bromo-5-methyl-2[1H]-pyridone. Recrystallization from benzene-petroleum ether gives analytically pure material, M.P. 154–158° C.

It may be noted that N-bromosuccinimide may be used in place of bromine in the above reactions with the mixture being heated until succinimide precipitation is complete.

Treatment of the pyridones of Examples 3, 5 and 6 in accordance with the above process will result in the production of the corresponding 3 (or 5) bromopyridones.

EXAMPLE 8

Preparation of 4-t-butyl-3-dimethylamine-2[1H]-pyridone

A mixture of 4-t-butyl-3-nitro-2[1H]-pyridone (0.82 g., 4.2 mmole), glacial acetic acid (6 ml.), methanol (48 ml.), 37% formaldehyde solution (2.6 ml.) and Raney nickel (¼ tsp.) is reacted in a 40 p.s.i. hydrogen atmosphere at room temperature until slightly over the theoretical amount of hydrogen has been absorbed. After filtering, a slight excess of solid sodium bicarbonate is added and the mixture stirred and concentrated in vacuo to a solid crust.

The residue is then extracted with chloroform and the chloroform extracts dried, filtered and concentrated in vacuo to a crude product. Recrystallization from acetone yields 4-t-butyl-3-dimethylamino-2[1H]-pyridone, M.P. 173–177.5° C.

When the nitro pyridones of Examples 3 and 6, and 3,4,5 and 6 - nitro - 2[1H] - pyridones are treated as illustrated above, the corresponding dimethylaminopyridones are obtained.

For example, treatment of the nitropyridones of Table IV in accordance with the procedure of Example 8 results in the production of the aminopyridones of Table V.

TABLE V 3-dimethylamino-5,6-dimethyl-2-[1H]-pyridone (M.P. 185–189° C.)
3-dimethylamino-5-methyl-6-ethyl-2-[1H]-pyridone (M.P. 168–170° C.)
3-dimethylamino-6-isobutyl-2-[1H]-pyridone (M.P. 108–109° C.)
3-dimethylamino-6-methyl-2-[1H]-pyridone (M.P. 118.5–120° C.)
3-dimethylamino-4-ethyl-2-[1H]-pyridone (M.P. 155–157° C.)
3-dimethylamino-5-isopropyl-6-methyl-2-[1H]-pyridone (M.P. 117–122° C.)
3-dimethylamino-6-ethyl-2-[1H]-pyridone (M.P. 84–87° C.)
3-dimethylamino-5-ethyl-6-methyl-2-[1H]-pyridone
3-dimethylamino-5-methyl-2-[1H]-pyridone (M.P. 118.5–120° C.)
3-dimethylamino-4,5,6-trimethyl-2-[1H]-pyridone M.P. 205–209° C.)
3-dimethylamino-5-ethyl-2-[1H]-pyridone
3-dimethylamino-4-methyl-2-[1H]-pyridone (M.P. 119–121° C.)
3-diethylamino-6-methyl-2-[1H]-pyridone (M.P. 133–136° C.)
3-dimethylamino-2-[1H]-pyridone (M.P. 134–235° C.)
3,4-dimethyl-5-dimethylamino-2-[1H]-pyridone (M.P. 155–157° C.)
4-methyl-5-dimethylamino-2-[1H]-pyridone (M.P. 128–131° C.)

When acetaldehyde is used in place of formaldehyde in the above reaction mixture, the corresponding diethylamino-2[1H]-pyridone is obtained. Furthermore, one skilled in the art will appreciate that other catalysts, such as palladium on carbon, may be used in place of Raney nickel.

When a limited amount of aldehyde is used, for example, one equivalent of formaldehyde, and the mixture chromatographed on silica gel, the corresponding monomethylamino compound is obtained: For example 5-methyl-3-nitro-2[1H]-pyridone yields 5-methyl-3-methylamino-2[1H]-pyridone, (M.P. 136–140° C.) in accordance with the above process utilizing formaldehyde solution. Accordingly, the following pyridones may be prepared according to this procedure:

3-methylamino-5-methyl-6-ethyl-2-[1H]-pyridone (M.P. 182–184° C.)
3-methylamino-5,6-dimethyl-2-[1H]-pyridone (M.P. 207–210° C.)
3-methylamino-1,5-dimethyl-2-[1H]-pyridone
3-methylamino-5-ethyl-6-methyl-2-[1H]-pyridone

EXAMPLE 9

Preparation of 3-dimethylamino-5-methyl-2[1H]-pyridone

A mixture of 3-bromo-5-methyl-2[1H]-pyridone (1.9 g., 0.01 m.), dimethylformamide (25 ml.) and 40% aqueous dimethylamine (10 ml.) in a sealed glass tube is heated for 8 days at 155° C. The mixture is cooled, opened, concentrated in vacuo, and the residue obtained chromatographed on a silica gel column using a methanol-methylene chloride system (v./v. 0–10% methanol) as eluant to yield 3-dimethylamino-5-methyl-2[1H]-pyridone, M.P. 118.5–120° C. (acetone).

When other halopyridones of Example 7 are reacted as above, the corresponding alkylaminopyridones are obtained.

When monomethylamine, ammonia, diethylamine, morpholine, etc., and other amines are used in place of dimethylamine in the above reaction, the corresponding aminopyridone is obtained. N-methyl pyrrolidone may be employed as the solvent in such reaction in place of the dimethylformamide, the reaction proceeding at temperatures up to about 180° C.

EXAMPLE 10

Preparation of 3-amino-4-methyl-2[1H]-pyridone

A mixture of 4-methyl-3-nitro-2[1H]-pyridone (1.5 g., 0.01 m.) methanol (75 ml.) and Raney nickel (¼ tsp.) is reacted in a 40 p.s.i. hydrogen atmosphere at room temperature until hydrogen uptake is complete. The mixture is filtered under nitrogen and concentrated in vacuo to an oily crust. After being taken up in chloroform and filtered, benzene is added to the mixture and the chloroform boiled away. The benzene solution is fractionally precipitated with petroleum ether to yield 3-amino-4-methyl-2[1H]-pyridone, M.P. 140–140.5° C.

Palladium on carbon may be used in place of nickel in the above procedure.

When the nitropyridones of Examples 3 and 6 are reduced as above, the corresponding aminopyridones are obtained.

EXAMPLE 11

Preparation of 3-n-butylamino-6-methyl-2[1H]-pyridone

A mixture of 6-methyl-3-nitro-2[1H]-pyridone (1.54 g., 0.01 m.) butylaldehyde (1.0 ml., 0.011 m.), methanol (100 ml.), 5% palladium on carbon (0.3 g.), and sulfuric acid (0.001 ml.) is reacted in a 40 p.s.i. hydrogen atmosphere while slowly being heated to 70° C. When hydrogen uptake has ceased, the mixture is cooled, filtered and sodium bicarbonate added to neutralize the sulfuric acid. The mixture is concentrated in vacuo to a solid, extracted with methylene chloride and the extracts dried and concentrated to a small volume. The mixture is then chilled and filtered to give 3-n-butylamino-6-methyl-2-[1H]-pyridone. Recrystallization from methanol yields analytically pure material melting at 156–157.5° C.

EXAMPLE 12

Preparation of 6-methyl-3-N-morpholino-2[1H]-pyridone

A stirred, nitrogen covered, mixture of 3-amino-6-methyl-2[1H]-pyridone (2.5 g., 0.02 m.), N-methylpyrrolidone (250 ml.) and anhydrous calcium carbonate (10 g.) is treated with bis(bromoethyl)ether (2.4 ml., 0.02 m.) and the mixture heated over two hours to 160° C. The mixture is kept at 166–168° C. for twenty-four hours, filtered hot, cooled and the filtrate concentrated in vacuo. The residue is partitioned between chloroform-water, the chloroform layer dried, filtered, and concentrated in vacuo to a solid. The solid is then triturated with ether, filtered, and recrystallized from methanol to yield 6-methyl-3-N-morpholino-2[1H]-pyridone, M.P. 205–206.5° C.

When other dihalo compounds, such as 1,5-dibromopentane, 1,4-dibromobutane, N - methyl-bis-(β-chloroethyl)-amine, etc. are used in place of the bis(bromoethyl) ether, above, the corresponding cyclic amine is obtained.

When long-chained alkyl halides, such as butyl bromide, hexyl bromide, etc., are used above, the corresponding monoalkylated amine is obtained, such as 3-n-butylamino-6-methylpyridone, etc.

When the aminopyridones of Example 10 are used in place of 3-amino-6-methylpyridone in the above example, the corresponding alkylaminopyridones are obtained.

EXAMPLE 13

Preparation of 4-methyl-3-trimethylammonium-2[1H]-pyridone iodide

A warm, filtered solution of 3-dimethylamino-4-methyl-2[1H]-pyridone (0.2 g.) in methyliodide (6 ml.) is boiled down to ca. 2.5 ml., and allowed to stand several days. The precipitate is then filtered, washed with ether and dried to yield 4 - methyl - 3-trimethylammonium-2[1H]-pyridone iodide, dec. 219.5° C.

EXAMPLE 14

Preparation of 5-chloro-3-dimethylamino-4,6-dimethyl-2[1H]-pyridone

A stirred mixture of 3-dimethylamino - 4,6 - dimethyl-2[1H]-pyridone (0.5 g., 0.003 m.), methylene chloride (4.5 ml.), and N-chlorosuccinimide (0.4 ml., 0.003+ m.) is stirred at room temperature under a nitrogen atmosphere for 27 hours. The mixture is then diluted with fresh methylene chloride, washed with water and the methylene chloride layer dried and concentrated to oily crystals. Recrystallization from acetone yields 5-chloro-3-dimethylamino-4,6-dimethyl-2[1H]-pyridone, M.P. 135–138° C.

When the amines of Examples 8, 11 and 12 are heated as above, the corresponding chloro compounds are obtained. Use of N-bromosuccinimide yields the bromo compounds.

Alternately, the reaction may advantageously be done on the nitropyridone to yield the halonitropyridone, which is then selectively reduced, and alkylated to the haloaminopyridone.

EXAMPLE 15

Preparation of 3-nitro-5-trifluoromethyl-2[1H]-pyridone (A) A mixture of 3-nitro-5-carboxy-2[1H]-pyridone (6.0 g.), phosphorous pentachloride (17 g.) and phosphorous oxychloride (50 ml.) is heated gently on the steam-cone overnight. The excess phosphorous oxychloride is removed in vacuo, the residue added to water, stirred overnight, and filtered to give crude 6-chloro-5-nitro-nicotinic acid.

(B) A mixture of the above acid (6 g.), sulfur tetrafluoride (20 g.) and hydrogen fluoride (4 g.) is heated at 100° C. for 17 hours in a stainless steel bomb, then at 150° C. for 15 hours, cooled, evacuated to a residue and the residue partitioned between cold 2.5 N sodium hydroxide solution chloroform, the chloroform layer separated and the chloroform removed in vacuo to yield the crude 2-chloro-3-nitro-5-trifluoromethylpyridine which is then purified via chromatography on a silica gel column or via distillation.

(C) A stirred mixture of the above 2-chloropyridine (0.02 m.), silver acetate (0.021 m.) and acetic acid (35 ml.) is refluxed gently for 75 hours, filtered hot and water (5 ml.) added. The mixture is then heated on the steam cone for two hours to hydrolyze the 2-acetoxy intermediate and concentrated in vacuo. The residue is then chromatographed on a silica gel column using methanol-methylene chloride system (v./v. 0–15% methanol) as eluant to yield 3-nitro-5-trifluoromethyl-2[1H]-pyridone.

Conversion to the aminopyridone compounds of the invention is effected in accordance with the procedures of Example 8.

EXAMPLE 16

Preparation of 3-acetyl-5-dimethylamino-6-methyl-2[1H]-pyridone

To a freshly prepared methylmagnesium iodidebenzene mixture (from 9.6 g. magnesium turnings in ether—replaced with 250 ml. benzene) is added a slurry of 3-cyano-5-dimethylamino-6-methyl-2[1H]-pyridone (15 g.) in benzene (100 ml.), and the mixture refluxed for 5 hours. The mixture is then poured into water-ice containing acetic acid (40 ml.), the solid collected, dissolved in 30 ml. warm 2.5 N hydrochloric acid, filtered, and neutralized with ammonium hydroxide, the aqueous mixture extracted with chloroform, the chloroform concentrated in vacuo to yield 3-acetyl-5-dimethylamino-6-methyl-2[1H]-pyridone.

When other Grignard reagents are used in place of methylmagnesium iodide in the above reaction, the corresponding ketone is obtained.

When other substituted cyanopyridones are treated as above, the correspondingly substituted acylpyridone is obtained.

EXAMPLE 17

Preparation of 5-dimethylamino-3-α-hydroxyethyl-6-methyl-2[1H]-pyridone

To a mixture of 3-acetyl-5-dimethylamino-6-methyl-2[1H]-pyridone (0.02 m.) in ethanol (100 ml.) at 3° C. is added a solution of sodium borohydride (0.8 g.) in ethanol (8 ml.)-water (0.5 ml.) over 6 minutes. The mixture is allowed to warm to room temperature, stirred overnight and acetic acid (2 ml.) added. The solvents are then removed in vacuo. Distribution of the oil obtained between methylene chloride-dilute sodium bicarbonate solution, followed by removal of the methylene chloride yields 5 - dimethylamino - 3 - α - hydroxyethyl-6-methyl-2[1H]-pyridone.

EXAMPLE 18

Preparation of 4-t-butyl-5-cyano-3-dimethylamino-2[1H]-pyridone

A mixture of 5 - bromo - 4 - t-butyl-3-dimethylamino-2[1H]-pyridone (0.02 m.), cuprous cyanide (0.025 m.) and N-methylpyrrolidone is deaerated, covered with a nitrogen atmosphere and heated slowly to 180° C. The mixture is kept at this temperature for 3 hours, cooled and then partitioned between chloroform-7% hydrochloric acid containing ferric chloride (0.025 m.). After a short time, the aqueous layer is basified with sodium bicarbonate. The chloroform layer is separated, dried, filtered and concentrated in vacuo to crude 4-t-butyl-5-cyano-3-dimethylamino-2[1H]-pyridone which is then purified via column chromatograhy on silica gel, using a methanol-methylene chloride system (v./v. 0–10% methanol) as eluant.

When the halopyridones of Examples 7 and 14 are reacted with cuprous cyanide as above, the corresponding cyano pyridones are obtained.

EXAMPLE 19

Preparation of 6-t-butyl-4-dimethylamino-2-[1H]-pyridone

2 - t - butyl-4-dimethylaminopyridine-N-oxide (prepared from 2-t-butyl-N-oxide via the sequence of Katritzky for the des t-butyl compound, J. Chem. Soc. (1956) 2404) is reacted with acetic anhydride and the resultant acetoxy compound hydrolyzed via the procedure of Example 5 to yield 6-t-butyl-4-dimethylamino-2-[1H]-pyridone.

EXAMPLE 20

Preparation of 6-dimethylamino-4-methyl-2[1H]-pyridone

A mixture of 6-chloro-4-methyl-2[1H]-pyridone (0.02 m.), dimethylformamide (50 ml.) and 40% aqueous dimethylamine (20 ml.) is heated in a sealed tube at 160° C. for 6 days, cooled, vented and concentrated in vacuo to a residue. The residue is partitioned between chloroform-dilute bicarbonate solution, the chloroform layer washed with water (50 ml.), dried and concentrated. The residue is then chromatographed (silica gel) or converted to the hydrochloride and then freed of hydrogen chloride to yield 6-dimethylamino-4-methyl-2[1H]-pyridone.

Alternately, when 2-dimethylamino-4-methylpyridine is reacted with sodamide via the procedure of Example 1, and the resulting 2-amino compound diazotized via the procedure of Example 3, the dimethylaminopyridone is obtained.

EXAMPLE 21

Preparation of 3-fluoro-4-methyl-2[1H]-pyridone (A) 3-fluoro-4-methylpyridine is converted to the N-oxide via the procedure of Example 4 in quantitative yield. (M.P. 139–141.5° C.).

(B) To an ice-cooled, stirred portion (25 ml.) of sulfuryl chloride is added 3-fluoro-4-methylpyridine-N-oxide (2.5 g.) in small portions. Solution occurs, followed by rapid precipitation of a yellow solid. The mixture is allowed to warm to room temperature, then refluxed for three hours. The mixture is cooled, added to ice (200 g.), and the mixture basified with ammonium hydroxide. Following extraction with ether, the ether extracts are dried and concentrated to an oil, which is chromatographed on a silica gel column using an ether-petroleum ether system (v./v. 0–20%) to yield 2-chloro-3-fluoro-4-methylpyridine and the 6-chloro isomer. Phosphorous oxychloride may be used in place of sulfuryl chloride in the above reaction.

(C) When the above 2-chloropyridine is hydrolyzed via the procedure of Example 15 C, 3-fluoro-4-methyl-2[1H]-pyridone is obtained. The 5-fluoro isomer is obtained from the 6-chloropyridine.

Conversion to the aminopyridones of the invention are effected in accordance with the procedures of Example 6 and 8.

EXAMPLE 22

Preparation of 3-dimethylamino-5-methylthio-4-t-butyl-2[1H]-pyridone

3 - dimethylamino - 5 - bromo-4-t-butyl-2[1H]-pyridone (0.05 m.) is added to a mixture of copper methylmercaptide (from 0.05 m. copper) in 2,4-lutidine (30 ml.) and the resultant mixture refluxed for 20 hours. After removal of the lutidine in vacuo, the residue is taken up in 2.5 N sodium hydroxide solution; washed with chloroform, the aqueous solution neutralized and extracted with chloroform. The chloroform solution is dried and concentrated in vacuo to a residue. Chromatography of the residue on a silica gel column using a methanol-methylene chloride system (v./v. 0–15% methanol) as eluant yields 3-dimethylamino-5-methylthio-4-t-butyl-2[1H]-pyridone.

When the bromopyridones of Example 7 are reacted with mercaptide as above, the corresponding methylmercaptopyridone is obtained.

When other alkylmercaptides, e.g., copper ethylpropyl-, butyl-, etc. mercaptide are used in place of copper methylmercaptide in the above example, the corresponding alkylthiopyridone is obtained.

EXAMPLE 23

Preparation of 5-methylsulfinyl-6-methyl-3-dimethylamino-2[1H]-pyridone

To an ice-cooled solution of 5-methylthio-6-methyl-3-nitro-2[1H]-pyridone (0.01 m.) in methanol-acetone is added a solution of sodium metaperiodate (0.012 m.) in a minimum of water. The mixture is stirred below 8° C. until precipitation of sodium iodate is completed. The sodium iodate is then removed by filtration, the solvents removed in vacuo, the residue taken up in chloroform and the chloroform solution dried, filtered and concentrated to crude 5-methylsulfinyl-6-methyl-3-nitro-2[1H] - pyridone. The crude material is purified via recrystallization or chromatography on a silica gel column. Reduction of the nitro compound in accordance with the teachings of Example 8 yields 5-methylsulfinyl-6-methyl-3-dimethylamino-2[1H]-pyridone (M.P. 231–232.8° C.).

Use of excess metaperiodate at elevated temperatures, followed by chromatography, yields 5-methylsulfonyl 4-ethyl-3-nitro-2[1H]-pyridone. The sulfonyl may also be obtained utilizing peroxide in acetic acid.

The alkylthiopyridones, prepared via the procedure of Example 23, yield the sulfoxide or sulfone when reacted as above. For example, 5-methylthio-3-nitro-2[1H]-pyridone yields 5-methylsulfinyl-3-nitro-2[1H]-pyridone and the corresponding sulfone, etc.

EXAMPLE 24

Preparation of 3-dimethylamino-6-ethyl-5-amino-2[1H]-pyridone

When 3-dimethylamino-6-ethyl-2[1H]-pyridone is nitrated as per Example 6, and the aqueous quench neutralized with ammonium hydroxide, 3-dimethylamino-6-ethyl-5-amino-2[1H]-pyridone is obtained.

Reduction (palladium on carbon catalyst) of this material at room temperature yields the 5-amino analog.

EXAMPLE 25

Preparation of 5-methoxy-1,6-dimethyl-3-nitro-2[1H]-pyridone

A mixture of 5-bromo-1,6-dimethyl-3-nitro-2[1H]-pyridone (0.03 m.), sodium methoxide (0.03 m.) and methanol is heated for 8 hours at 150° C. in a sealed tube and then cooled. The mixture is made slightly acidic, concentrated in vacuo, and the residue chromatographed on a silica gel column using a methanol-methylene chloride system (v./v. 0–20% methanol) as eluant to yield 5-methoxy-1,6-dimethyl-3-nitro-2[1H]-pyridone.

When sodium methoxide is replaced by other alkoxides in the above reaction, the corresponding alkoxy pyridone is obtained.

Reduction according to Examples 8 and 11 yields the corresponding alkylated amino compound.

EXAMPLE 26

Preparation of 5-carbamyl-4-methyl-3-nitro-2[1H]-pyridone 5-cyano-4-methyl-3-nitro-2[1H]-pyridone (0.02 m.) is added in small portions to cold, stirred sulfuric acid (25 ml.), stirred for 1 hour after solution attained, the mixture added to chopped ice, filtered, washed well with water and dried to yield 5-carbamyl-4-methyl-3-nitro-2[1H]-pyridone.

The compounds of the invention may then be obtained in accordance with the procedures of Examples 8 or 11.

EXAMPLE 27

Preparation of 4-carboxymethyl-3-dimethylamino-2[1H]-pyridone

To a solution of 3-dimethylamino-4-methyl-2[1H]-pyridone (0.02 m.) in freshly distilled tetrahydrofuran in an ice bath is added n-butyllithium (0.042 m.) in hexane. The resulting mixture is allowed to stir for 30 minutes and is then added slowly to a stirred tetrahydrofuran-Dry Ice (excess) mixture. After 1 hour, the solvent is removed in vacuo, the residue partioned between sodium carbonate-chloroform, the carbonate solution filtered and neutralized with dilute hydrochloric acid to yield 4-carboxymethyl-3-dimethylamino-2[1H]-pyridone. Purification is effected via chromatography of the corresponding methyl ester, or via recrystallization of the free compound or amine salt.

EXAMPLE 28

Preparation of 4-t-butyl-1-methyl-3-nitro-2[1H-]pyridone

To an ice-cooled, stirred mixture of 4-t-butyl-3-nitro-2 [1H]-pyridone (0.02 m.) in dimethylformamide (80 ml.) (nitrogen atmosphere) is added sodium hydride dispersion (0.02 m.) and the mixture stirred cold until hydrogen evolution has ceased and salt formation is complete. Methyliodide (0.022 m.) is then added to the stirred salt mixture in portions so as to keep the temperature less than 10° C. The mixture is then allowed to warm to room temperature overnight, added to ice-water (200 ml.) and extracted with chloroform. The chloroform extracts are washed with water, dried and then concentrated to a residue. Chromatography (silica gel) yields pure 4 - t-butyl-1-methyl-3-nitro-2[1H]-pyridone.

Employing the above procedure, the 1,5-dimethyl-3-nitro-2[1H]-pyridone is obtained which will yield the 1,5-dimethyl - 3-dimethylamino-2[1H]-pyridone (M.P. 277–279° C., 1,5-naphthylene disulfonic acid salt) when reductively methylated in accordance with Example 8.

When the pyridones prepared in the above examples are reacted in accordance with the process of Example 28, the corresponding 1-methylpyridones are obtained.

When ethyl-, propyl-, butyl-, methallyl-, 2-chloroallyl-, propargyl-, benzyl-, substituted benzyl-, phenethyl-, 3-hydroxypropyl-, 2-chloroethyl-, cinnamyl-, thenyl-, furfuryl-, substituted thenyl- and furfuryl-, such as 5-methyl-thenyl- and 4,5-diethylfurfuryl-, pyridylmethyl-, and substituted pyridylmethylbromides (iodides or chlorides) are used in place of methyliodide in the above examples, the corresponding N-substituted-pyridone is obtained. Conversion to the corresponding amino pyridone is effected according to Example 8.

When methyl bromoacetate is used, or when bromo or chloroacetic acid is used in the refluxing ethanoic potassium hydroxide procedure, the corresponding N-acetic acid or ester is obtained. The use of a dialkylaminoalkyl halide in the above process results in the production of the corresponding N-dialkylaminoalkyl pyridone.

EXAMPLE 29

Preparation of 4-t-butyl-3-nitro-1-phenyl-2[1H]-pyridone (A) The sodium salt of 4-t-butyl-3-nitro-2[1H]-pyridone is prepared via the procedure of Example 28, and after hydrogen evolution is completed, the solvent is removed in vacuo to leave the salt as a residue.

(B) Iodobenzene (0.03 m.) and copper powder (0.8 g.) is added to the salt and the mixture heated at gentle reflux for 16 hours. The mixture is cooled, chloroform added, the mixture filtered, concentrated in vacuo and the residual material chromatographed on a silica gel column using a methanol-methylene chloride system (v./v. 0–7% methanol) as eluant to yield 4-t-butyl-3-nitro-1-phenyl-2[1H]-pyridone.

When substituted halobenzenes, such as iodonitrobenzene, bromo-(trifluoromethyl)-benzene, (dimethylamino)-iodobenzene, etc. are used above in place of iodobenzene, the corresponding 1-(substituted phenyl)-2[1H]-pyridones are obtained.

When the pyridones prepared in the above examples are reacted in accordance with the process of Example 29, the corresponding 1-(phenyl and substituted-phenyl)-2[1H]-pyridones are obtained.

EXAMPLE 30

Preparation of 4-t-butyl-1,3-diamino-2[1H]-pyridone

The sodium salt of 4-t-butyl-3-dimethylamino-2[1H]-pyridone is added to a cold chloramine solution (prepared from 0.02 m. sodium hypochlorite solution via the procedure of Hoegerle and Erlenmeyer, Helv. 39, 1207 (1956)) and allow to stir cold overnight. Concentration of the chloroform solution obtained by continuous extraction of the reaction mixture yields 1-amino-4-t-butyl-3-dimethylamino-2[1H]-pyridone.

Alternately, treatment of the corresponding pyridone with hydrazine via procedures well known to those in the art gives the same 1-aminopyridone.

Reduction as in Examples 8 or 11, yields 4-t-butyl-1,3-diamino-2[H]-pyridone.

EXAMPLE 31

Preparation of 5,6-dimethyl-3-nitro-1-tetrahydropyranyl-2[1H]-pyridone

A solution of 5,6 - dimethyl-3-nitro-2[1H]-pyridone (0.03 m.) in benzene (100 ml.) containing enough dimethylformamide for solution is treated with anhydrous p-toluene-sulfonic acid (0.2 g.), followed by dihydropyran (0.3 m.) in benzene at room temperature. The mixture is then heated at ca. 70° C. for 6 hours, cooled, benzene added (150 ml.), and the mixture extracted with dilute 0.5% sodium hydroxide, water (5 times). The mixture is then dried and concentrated in vacuo to 5,6-dimethyl-3-nitro - 1 - tetrahydropyranyl-2[1H]-pyridone. Reduction under neutral conditions (palladium on carbon in methanol) yields the dimethylamino product.

EXAMPLE 32

Preparation of 3-nitro-6-methyl-2[1H]-pyridone-5-sulfonamide (A) 3-nitro-6-methyl-2-[1H]-pyridone is converted to 3 - nitro - 6-methyl-2[1H]-pyridone-5-sulfonic acid with chlorosulfonic acid via the procedure of German Patent 601,896.

(B) the sulfonic acid from (A) is converted to the methyl ester with diazomethane (1 equiv.), and the ester heated with concentrated ammonium hydroxide (aqueous) in a sealed glass tube at 150° C. for 10 hours, yielding 3-nitro-6-methyl-2[1H]-pyridone-5-sulfonamide.

Conversion to the alkylamino compounds of this invention is accomplished employing the procedures taught in Example 8.

When dimethylamine, ethylamine, etc. are used in place of ammonium hydroxide in the above reaction, the corresponding substituted sulfonamide is obtained.

EXAMPLE 33

Preparation of 3-dimethylamino-5-methyl-2-methoxypyridine (A) A mixture of 3 - nitro-5-methyl-2[1H]-pyridone (0.04 m.), phosphorus pentachloride (0.02 m.) and phosphorous oxychloride (20 ml.) is heated on the steam cone for 3 hours. The mixture is then cooled, added to crushed ice (100 ml.), and filtered to give 2-chloro-3-nitro-5-methylpyridine, M.P. 45–46.5° C.

(B) The chloropyridine from (A) and methanolic sodium methoxide (from 1.1 g. sodium and 50 ml. methanol) are refluxed together for 12 hours, filtered, the filtrate, concentrated in vacuo, and the residue taken up in chloroform, the chloroform washed with water, dried, and concentrated in vacuo to yield 3-nitro-5-methyl-2-methoxypyridine, M.P. 72–74° S. (petroleum ether).

When sodium ethoxide in ethanol, sodium-n-propoxide in propanol, etc. are used in place of sodium methoxide, the corresponding 2-alkoxy compound is obtained. Diazoalkanes may also be used to yield the o-alkyl ethers.

When the product of part (B) is reductively methylated as per Example 8, 3-dimethylamino-2-methoxy-5-methylpyridone is obtained.

When the pyridones of Examples 3, 5–9, 12, 14, 15, 19–24, are used in place of 3-nitro-5-methylpyridone in the above procedure, the corresponding 2-alkoxypyridines are obtained.

EXAMPLE 34

Preparation of 5-ethyl-3-dimethylamino-2-pyridinethione

A mixture of 5-ethyl-3-dimethylamino-2[1H]-pyridone (0.02 m.), phosphorous pentasulfide (1.9 g.) and pyridine (35 ml.) is refluxed gently for 3 hours. The mixture is concentrated in vacuo and the residue partitioned between chloroform-water. The chloroform layer is dried, filtered and concentrated in vacuo to a residue and the residue chromatographed on a silica gel column using a methanol-methylene chloride (v./v. 0–20% methanol) system as eluant to yield 5-ethyl-3-dimethylamino-2-pyridinethione.

When the pyridones of Examples 3, 5–9, 12, 14–15, and 19–25 are used in place of 5-ethyl-3-fluoropyridone in the above procedure, the corresponding pyridinethione is obtained.

EXAMPLE 35

Preparation of 6-benzylthio-3-dimethylamino-2[1H]-pyridone

A mixture of 6-chloro-3-dimethylamino-2[1H]-pyridone (13 g.), benzylmercaptan (13 g.), triethylamine (15 ml.) and benzene (150 ml.) in a stainless steel bomb is heated at 170° C. for 8 hours. The mixture is allowed to cool, and the benzene and excess reagents allowed to evaporate in the hood draft. The residue is distributed between chloroform-water, separated, and the chloroform soluble material chromatographed on silica gel to yield 6-benzylthio-3-dimethylamino-2[1H]-pyridone.

EXAMPLE 36

Preparation of 3-dimethylamino-5-trifluoromethyl-2[1H]-pyridone (A) A mixture of 6-chloronicotinic acid (29 g., 0.184 m.), sulfur tetrafluoride (130 g.) and hydrogen fluoride (18 ml.) is heated in a stainless steel bomb at 150° C. for 16 hours. After venting, the residue is carefully basified with NaOH solution (2.5 N) (keeping T–30° C.; ice cooling throughout), extracted with chloroform and the chloroform layer dried and concentrated to 17 g. yellow oil to yield 3-trifluoromethyl-6-chloropyridine.

(B) A mixture of the pyridine of part (A) (10 g.), silver acetate (11 g.) and glacial acetic acid (125 ml.) is refluxed under nitrogen for 50 hours and then filtered hot. Water (~40 ml.) is added to the filtrate, the aqueous mixture heated on the steam cone for 0.5 hours and then concentrated in vacuo to 11 g. tan solid. The solid is then distributed between chloroform-dilute sodium bicarbonate solution and filtered. The layers are separated using dry CHCl₃ and concentrated in vacuo to yield 5-trifluoromethyl-2[1H]-pyridone. Recrystallization from acetone yields pure material (M.P. 145–147.8° C.).

(C) To 0.95 l. fuming nitric acid (d.=1.5) at room temperature is added 29 g. of the pyridone of Part (B) in portions over 1 hour, and the mixture allowed to stir at ambient temperatures for 75 hours, stoppered. After allowing the excess acid to evaporate in the hood draft, the solid residue is taken up in acetone, transferred to a beaker, and the mixture blown down under nitrogen to a volume of ca. 60 ml. The cold mixture is filtered, the filtrate blown down to ~38 ml., filtered, and the two batches of solid combined to yield 3-nitro-5-trifluoromethyl-2[1H]-pyridone. Recrystallization from methylene chloride yields material melting at 184.5–186° C.

(D) Reductive methylation of the nitropyridone according to the procedure of Example 8 yields 3-dimethylamino-5-trifluoromethyl-2[1H]-pyridone (M.P. 126.5–129° C. from hexane).

EXAMPLE 37

Preparation of 5,6-dimethyl-3-methylamino-2[1H]-pyridone (A) A mixture of 3-amino-5,6-dimethyl-2-pyridone (2.0 g., 0.015 m.), phthalimide (2.2 g., 0.015 m.) and aqueous 37% formaldehyde (1.5 ml.) in ethanol (27 ml.) is refluxed on a steam cone for two hours, allowed to cool and filtered to give 5,6-dimethyl-3-(phthalimidomethylamino)-2-pyridone.

(B) Two grams of the above phthalimido derivative in 60 ml. of ethanol (anhydrous) is heated at 85° C. with 0.4 g. of Raney nickel in a 1100 p.s.i. hydrogen atmosphere for twelve hours. The mixture is filtered, the filtrate concentrated in vacuo to a solid, the solid stirred several hours with 2.5 N hydrochloric acid (20 ml.), filtered, and the cake washed with additional dilute hydrochloric acid. The aqueous filtrate is then basified with solid sodium bicarbonate, extracted three times with chloroform, the chloroform dried and concentrated to 5,6-dimethyl-3-methylamino-2[1H]-pyridone. Two recrystallizations from acetone yield analytical material, M.P. 207.5–210° C.

In accordance with the above procedure, wherein 3-amino-5-methyl-6-ethyl-2-pyridone is employed in place of the 3-amino-5,6-dimethyl-2-pyridone the following is obtained: 5-methyl-6-ethyl-3-methylamino-2[1H]-pyridone (M.P., 182–184° C.).

EXAMPLE 38

Preparation of 5-methoxy-6-methyl-3-dimethylamino-2-[1H]-pyridone (A) To a stirred cold mixture of concentrated sulfuric acid (110 ml.) and fuming nitric acid (110 ml.) is added 19 g. of 3-methoxy-2-picoline over ca. 30 minutes, keeping the internal temperature less than 15° C. The mixture is allowed to warm to room temperature, placed in an oil bath, the bath heated to 60° C., kept 6 hours, cooled, and the acid mixture added to 1.1 kilogram ice-water. After stirring for ca. 2 hours, the mixture is filtered to yield 3-methoxy-6-nitro-2-picoline, M.P. 97.5–99.5° C.

(B) A mixture of 8.4 g. (0.05 m.) of the above nitro compound, methanol (500 ml.), and 5% palladium on charcoal (2 g.) is reacted in a 40 p.s.i. hydrogen atmosphere until hydrogen uptake ceases. Filtering and evaporation of the methanol yields 6-amino-3-methoxy-2-picoline as a light grey solid.

(C) Following the diazotiazation procedure of Example 3 while maintaining the temperature below 5° C., 5-methoxy-6-methyl-2[1H]-pyridone is obtained (M.P. 145.5–148° C.).

(D) In accordance with the nitration procedure of Example 6, being certain to maintain the temperature at or below 5° C. the following is obtained: 3-nitro-5-methoxy-6-methyl-2[1H]-pyridone.

(E) Reductive methylation of the nitropyridone of part (D) according to the procedure of Example 8 yields 5-methoxy-6-methyl-3-dimethylamino-2[1H]-pyridone (M.P. 133–134° C.).

EXAMPLE 39

Preparation of 3-dimethylamino-5-hydroxymethyl-6-methyl-2-[1H]-pyridone (A) To a mixture of lithium borohydride (0.11 g.) in dry tetrahydrofuran (15 ml.), stirring, is added 2-methoxy-3-nitro-5-methoxycarbonyl-6-methylpyridine (0.8 g.) in additional solvent (10 ml.) over ca. 1 minute. The oil bath is then heated to 75° C., and kept 19 hours. After cooling, water is added carefully, the tetarhydrofuran is removed in vacuo, and the aqueous mixture extracted with chloroform to yield 5-dimethylamino-3-hydroxymethyl-6-methoxy-2-picoline as a pale tan oil.

(B) To 0.4 g. of the preceding 2-methoxypyridine is added water (15 ml.), followed by concentrated hydrochloric acid (15 ml.), swirling, and the resultant solution heated gently for three hours on the steam cone. The mixture is then cooled, water added (15 ml.), and the mixture neutralized with concentrated ammonium hydroxide, keeping the temperature less than 10° C. The mixture is then allowed to evaporate to dryness in the hood draft, the residual solid extracted well with boiling chloroform, the chloroform removed to give 3-dimethylamino-5-hydroxymethyl-6-methyl-2[1H]-pyridone; Recrystallization from acetone yields material melting at 167–171° C., decomposition.

EXAMPLE 40

Preparation of 3-dimethylamino-5-ethoxymethyl-6-methyl-2[1H]-pyridone (A) To a suspension of 5-carbomethoxy-3-dimethylamino-6-methyl-2[1H]-pyridone (0.84 g.) in dry tetrahydrofuran is added lithium aluminum hydride (168 mg.) in small portions. The resulting mixture is heated at 65° C. for ca. 15 hours, cooled, ethyl acetate added and the mixture allowed to stir. 2.5 N NaOH is then added (~3 ml.), followed by dilute hydrochloric acid to pH~8. The aqueous mixture is allowed to evaporate to dryness in the hood draft, extracted well with chloroform, and the chloroform extracts chromatographed on a silica gel column to yield 3-dimethylamino-5-ethoxymethyl-6-methyl-2[1H]-pyridone, M.P. 88–95° C. (from ether).

When the ethylacetate decomposition is omitted, and the residue from the aqueous evaporation boiled with a methanol-chloroform mixture, the corresponding 5-methoxymethyl, M.P. 136.5–138.5° C., is obtained.

These compounds are also advantageously obtained via alkylation of the corresponding 5-hydroxymethyl compounds, preferably at the 2-methoxypyridine stage, as set forth in the procedure of Example 39.

EXAMPLE 41

Preparation of 3-dimethylamino-6-($\alpha$-methoxyethyl)-5-methyl-2[1H]-pyridone A mixture of 6.5 g. (0.03 mole) of 3-bromo-6-ethyl-5-methyl-2-pyridone, 4.9 g. (0.09 mole) of sodium methoxide, and 150 ml. of methanol is heated in a sealed tube at 180° C. for 5 days. The inorganic solid is filtered, and the filtrate is evaporated in vacuo. The residue is extracted with benzene and more inorganic solid is removed. The benzene is evaporated and the residue is passed over alumina with 5% methanol in methylene chloride to obtain the pure 6-($\alpha$-methoxyethyl)-5-methyl-2 - pyridone which melts at 136–138° C. $C_9H_{13}NO_2$.

Nitration of the 6-($\alpha$-methoxyethyl)-5 - methyl - 2-pyridone in accordance with the process of Example 6 yields 3-nitro-6-($\alpha$-methoxyethyl)-5-methyl - 2 - pyridone which is then reductively methylated according to Example 8 to obtain 3-dimethylamino-6-($\alpha$-methoxyethyl)-5-methyl-2[1H]-pyridone (M.P. 108–110° C.).

EXAMPLE 42

Preparation of 1-methyl-2-pyridone-5-sulfonic acid dimethyl amide

A suspension of 1-methyl-2-pyridone-5-sulfonic acid (5.5 g.) in thionyl chloride (100 ml.) containing dimethylformamide (0.01 ml.) is refluxed overnight. The excess thionyl chloride is removed in vacuo and the residual crude acid chloride disolved in a minimum of methylene chloride, is added to an ice-cooled, stirred 50 ml. portion of 40% aqueous dimethylamine over ca. 30 minutes. The mixture is stirred at room temperature overnight, the organic layer concentrated in vacuo and the residue chromatographed on a silica gel column to yield 1-methyl-2-pyridone-5-sulfonic acid dimethylamine, M.P. 132–134° C. after recrystallization from acetone.

When the above sulfonamide is brominated and reacted with dimethylamine in dimethylformamide as per Examples 7 and 9, the 3-dimethylamino analog is obtained.

EXAMPLE 43

Preparation of 3-dimethylamino-5-fluoro-6-methyl-2[1H]-pyridone

The 2-chloro-5-fluoro-6-methylpyridine starting material is prepared from 2-chloro-5-amino-6-methylpyridine according to the procedure of Ber. 60, 1188 (1927); the intermediate diazonium fluoroborate having a melting point of 105° C. (dec.).

The 2-chloro-5-fluoro-6-methylpyridine is converted to the pyridone following the procedure of Example 15(C). Nitration in accordance with Example 6 followed by reductive methylation according to Example 8 yields 3-dimethylamino-5-fluoro-6-methyl-2[1H]-pyridone.

The corresponding chloro analogus is prepared in accordance with the above process: 3-dimethylamino-5-chloro-6-methyl-2[1H]-pyridone (M.P. 220–220.5° C.).

The invention is further demonstrated by the following examples in which all parts are by weight.

EXAMPLE 44

A mixture of 250 parts of 3-dimethylamino-4-methyl-2[1H]-pyridone and 25 parts of lactose is granulated with suitable water, and to this is added 100 parts of maize starch. The mass is passed through a 16 mesh screen. The granules are dried at a temperature below 60° C. The dry granules are passed through a 16 mesh screen, and mixed with 3.8 parts of magnesium stearate. They are then compressed into tablets suitable for oral administration.

The 3-dimethylamino-4-methyl-2[1H]-pyridone used in the foregoing example may be replaced by 25, 100 or 500 parts of other pyridones of this invention to produce tablets suitable for oral administration an antiinflammatory, antipyretic and/or analgesic according to the method of this invention.

EXAMPLE 45

A mixture of 50 parts of 3-dimethylamino-6-ethyl-5-methyl-2[1H]-pyridone, 3 parts of the calcium salt of lignin sulphonic acid, and 237 parts of water is ball-milled until the size of substantially all of the particles of 3-dimethylamino-6-ethyl-5-methyl-2[1H]-pyridone is less than 10 microns. The suspension is diluted with a solution containing 3 parts of sodium carboxymethylcellulose and 0.9 parts of the butyl ester of p-hydroxybenzoic acid in 300 parts of water. There is thus obtained an aqueous suspension suitable for oral administration for therapeutic purposes.

EXAMPLE 46

A mixture of 250 parts of 3-dimethylamino-5-methyl-2[1H]-pyridone, 200 parts of maize starch and 30 parts of alginic acid is mixed with a sufficient quantity of 10% aqueous maize starch, and granulated. The granules are dried in a current of warm air and the dry granules are then passed through a 16-mesh screen, mixed with 6 parts of magnesium stearate and compressed into tablet form to obtain tablets suitable for oral administration.

EXAMPLE 47

A mixture of 500 parts 3-dimethylamino-5,6-dimethyl-2[1H]-pyridone, 60 parts maize starch and 20 parts of gum acacia is granulated with a sufficient quantity of water. The mass is passed through a 12-mesh screen and the granules are dried in a current of warm air. The dry granules are passed through a 16-mesh screen, mixed with 5 parts of magnesium stearate and compressed into tablet form suitable for oral administration.

EXAMPLE 48

(1) Tablets.—10,000 scored tablets for oral use, each containing 500 mg. of pyridone, are prepared from the following ingredients:

| | Gm. |
|---|---|
| 3-dimethyl-amino-5-methyl-2[1H]pyridone | 5000 |
| Starch, U.S.P | 350 |
| Talc, U.S.P. | 250 |
| Calcium stearate | 35 |

The powdered pyridone is granulated with a 4% w./v. aqueous solution of methylcellulose U.S.P. (1500 cps.). To the dried granules is added a mixture of the remainder of the ingredients and the final mixture compressed into tablets of proper weight.

(2) Capsules.—10,000 two-piece hard gelatin capsules for oral use, each containing 250 mg. of pyridone are prepared from the following ingredients:

| | Gm. |
|---|---|
| 3-dimethyl-amino-4-methyl-2[1H]pyridone | 2500 |
| Lactose, U.S.P. | 1000 |
| Starch, U.S.P. | 300 |
| Talc, U.S.P. | 65 |
| Calcium stearate | 25 |

The powdered pyridone is mixe dwith the starch-lactose mixture followed by the talc and calcium stearate. The final mixture is then encapsulated in the usual manner. Capsules containing 10, 25, 50 and 100 mg. of pyridone are also prepared by substituting 100, 250, 500 and 1000 gm. for 2500 gm. in the above formulation.

(3) Soft elastic capsules.—One-piece soft elastic capsules for oral use, each containing 200 mg. of 3-amino-4-methyl-2[1H]pyridone, are prepared in the usual manner by first dispersing the powdered active material in sufficient corn oil to render the material capsulatable.

(4) Aqueous suspension.—An aqueous suspension for oral use containing in each 5 ml., 1 gram of pyridone is prepared from the following ingredients:

| | |
|---|---:|
| 3-dimethylamino-6-ethyl-5-methyl-2[1H]-pyridone _____gm__ | 2000 |
| Methylparaben, U.S.P. _____gm__ | 7.5 |
| Propylparaben U.S.P. _____gm__ | 2.5 |
| Saccharin sodium _____gm__ | 12.5 |
| Cyclamate sodium _____gm__ | 2.5 |
| Glycerin _____ml__ | 3000 |
| Tragacanth powder _____gm__ | 10 |
| Orange oil flavor _____gm__ | 10 |
| F.D. and C. orange dye _____gm__ | 7.5 |
| Deionized water, q.s. to 10,000 mg. | |

What is claimed is:

1. A compound having the formula:

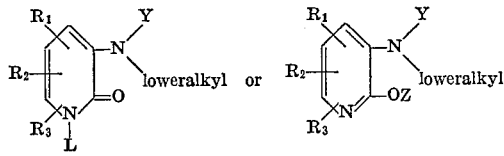

and therapeutically acceptable acid addition salts thereof, wherein

L is hydrogen, loweralkyl or lower alkenyl;
Z is H or loweralkyl;
Y is hydrogen or lower alkyl of 1–4 carbon atoms;
$R_1$, $R_2$ and $R_3$ are each hydrogen, loweralkyl, halo-loweralkyl, lower alkoxy, lower alkenyl or lower alkynyl with the proviso that at least one R must be lower alkyl.

2. A compound according to claim 1 selected from the group consisting of 3-dimethylamino-5-methyl-2-[1H]-pyridone,
3-dimethylamino-4-methyl-2-[1H]-pyridone,
3-methylamino-5-ethyl-6-methyl-2-[1H]-pyridone,
3-dimethylamino-5-ethyl-6-methyl-2-[1H]-pyridone,
3-methylamino-5-methyl-6-ethyl-2-[1H]-pyridone,
3-methylamino-5,6-dimethyl-2-[1H]-pyridone,
3-dimethylamino-4,5-dimethyl-2-[1H]-pyridone,
3-dimethylamino-5,6-dimethyl-2-[1H]-pyridone,
3-dimethylamino-4-ethyl-2-[1H]-pyridone,
3-dimethylamino-6-ethyl-2-[1H]-pyridone,
3-butylamino-5-methyl-2-[1H]-pyridone,
5-methyl-3-methylamino-2-[1H]-pyridone,
4,5,6-trimethyl-3-dimethylamino-2-[1H]-pyridone,
3,4-dimethyl-5-dimethylamino-2-[1H]-pyridone,
3-dimethylamino-6-methyl-2-[1H]-pyridone,
5-dimethylamino-3-methyl-2-[1H]-pyridone,
4,6-dimethyl-3-dimethyl-amino-2-[1H]-pyridone,
3-diethylamino-5-methyl-2-[1H]-pyridone,
4-dimethylamino-6-methyl-2-[1H]-pyridone,
3-dimethylamino-6-t-butyl-2-[1H]-pyridone,
3-dimethylamino-6-methyl-5-i-propyl-2-[1H]-pyridone,
3-dimethylamino-5-ethyl-2-[1H]-pyridone,
3-diethylamino-5-t-butyl-2-[1H]-pyridone,
3-dimethylamino-6-sec-butyl-2-[1H]-pyridone and
3-dimethylamino-6-ethyl-5-methyl-2-[1H]-pyridone.

3. A compound according to claim 2 selected from the group consisting of 3-dimethylamino-5-methyl-6-ethyl-2-[1H]-pyridone,
3-dimethylamino-6-methyl-2-[1H]-pyridone,
3-dimethylamino-5,6-dimethyl-2-[1H]-pyridone,
3-dimethylamino-5-ethyl-6-methyl-2-[1H]-pyridone,
3-methylamino-5-methyl-6-ethyl-2-[1H]-pyridone,
3-methylamino-5,6-dimethyl-2-[1H]-pyridone, and
3-methylamino-5-ethyl-6-methyl-2-[1H]-pyridone.

4. 3-dimethylamino-5-methyl-6-ethyl-2-[1H] - pyridone according to claim 3.

5. 3-dimethylamino-6-methyl-2-[1H]-pyridone according to claim 3.

6. 3-dimethylamino-5,6-dimethyl-2-[1H]-pyridone according to claim 3.

7. 3-dimethylamino-5-ethyl-6-methyl-2-[1H] - pyridone according to claim 3.

8. 3-methylamino-5-methyl-6-ethyl-2-[1H] - pyridone according to claim 3.

9. 3-methylamino-5,6-dimethyl-2-[1H] - pyridone according to claim 3.

10. 3-methylamino-5-ethyl-6-methyl-2-[1H] - pyridone according to claim 3.

References Cited

UNITED STATES PATENTS 3,654,291  4/1972  Witzel et al. _____ 260—296 R

ALAN L. ROTMAN, Primary Examiner

U.S. Cl. X.R.

260—247.1; 247.2 A, 268 H, 293.69, 294.8 D, 294.8 F, 294.8 G, 294.8 T, 295 R, 295 AM; 424—248, 250, 263, 266, 267